March 3, 1959
R. D. STARR
2,875,465
BOOTBLACK STAND
Filed Aug. 20, 1957
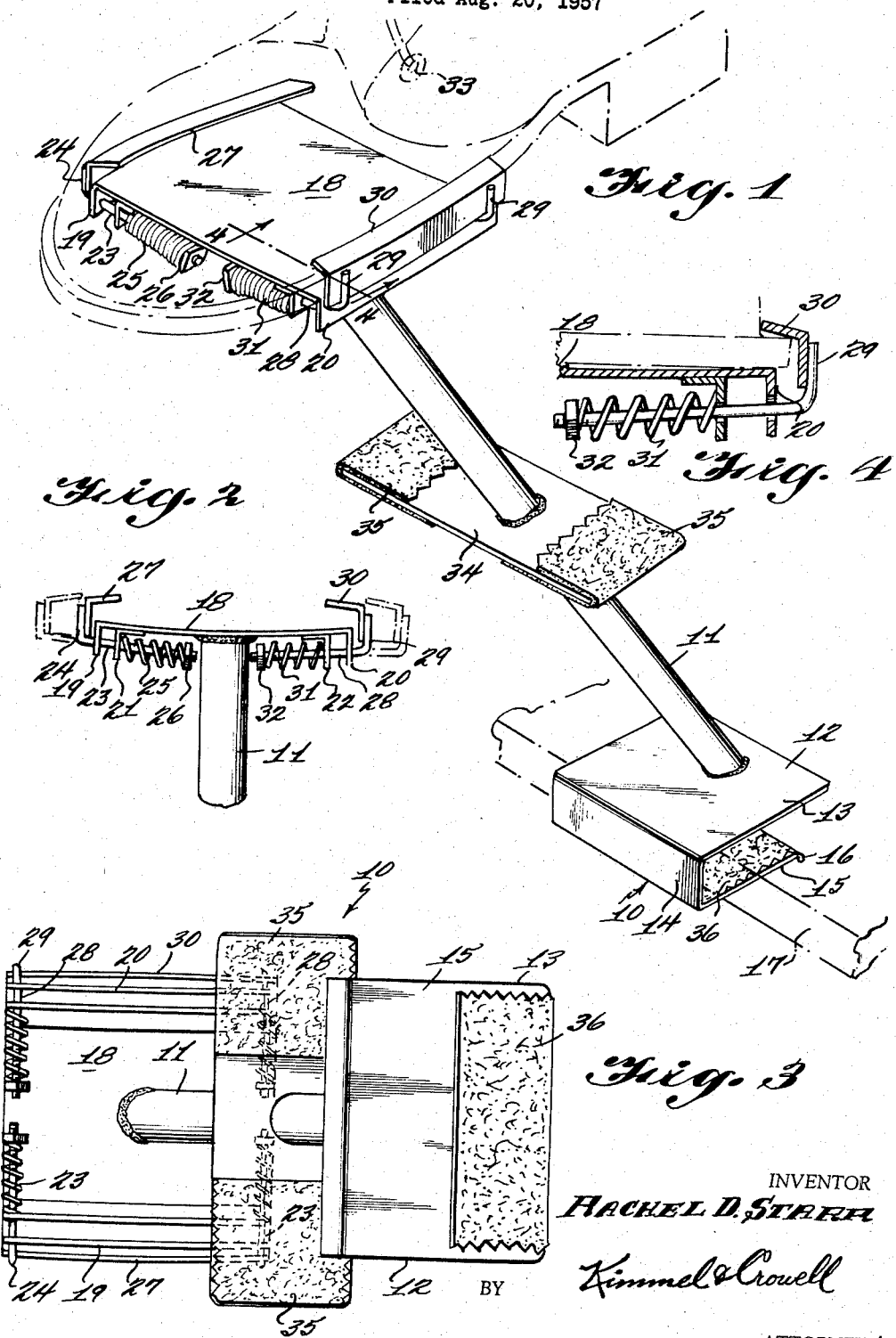
INVENTOR
RACHEL D. STARR
BY Kimmel & Crowell
ATTORNEYS

United States Patent Office 2,875,465
Patented Mar. 3, 1959

2,875,465
BOOTBLACK STAND
Rachel D. Starr, San Antonio, Tex.
Application August 20, 1957, Serial No. 679,259
4 Claims. (Cl. 15—267)

The present invention relates to bootblack stands, and more particularly to stands for use in the home when shining shoes.

The primary object of the invention is to provide a bootblack stand for supporting a shoe in position to be shined when not being worn.

Another object of the invention is to provide a bootblack stand of the class described above which can be attached to a kitchen chair or other horizontal support without damage to the chair or support.

A further object of the invention is to provide a bootblack stand of the class described above having means thereon for detachably clamping a shoe in position to be shined.

A still further object of the invention is to provide a bootblack stand of the class described above which is inexpensive to manufacture, simple to use, and which can be stored in a relatively small space.

Other objects and advantages will become apparent in the following specification when considered in the light of the attached drawings, in which:

Figure 1 is a perspective view of the invention.

Figure 2 is a fragmentary front elevation of the invention.

Figure 3 is a bottom plan view of the invention.

Figure 4 is an enlarged fragmentary vertical transverse cross-section taken along the line 4—4 of Figure 1, looking in the direction of the arrows.

Referring now to the drawings in detail wherein like reference characters indicate like parts throughout the several figures, the reference numeral 10 indicates generally a bootblack stand constructed in accordance with the invention.

The bootblack stand 10 includes an angularly extending tubular shaft 11 having a generally rectangular resilient clamp 12 secured to its lower end by means of welding.

The rectangular clamp 12 has an upper plate 13 from which the shaft 11 extends, a depending flange 14 extending perpendicularly from one edge of the upper plate 12, and a lower plate 15 integrally secured to the lower edge of the flange 14 in spaced parallel relation to the upper plate 13.

The lower plate 15 has the free edge thereof flared at 16 to assist in engaging the clamp 12 over a horizontal support 17 shown in broken lines in Figure 1.

A plate 18 is welded to the upper end of the shaft 11 in parallel relation to the upper plate 13 of the clamp 12 and has depending flanges 19 and 20 integrally formed on the opposite side edges thereof. A pair of angle brackets 21 and 22 are secured to the underside of the plate 18 in spaced parallel relation to the flanges 19 and 20, respectively.

A pair of threaded shafts 23 extend through the flange 19 and bracket 21 adjacent the opposite ends thereof and have perpendicularly offset end portions 24 integrally formed thereon. The threaded shafts 23 are arranged to reciprocate in the flange 19 and bracket 21 and have a spring 25 arranged thereabout and engaging at one end the bracket 21 and at the other a nut 26 threaded onto the shaft 23. The spring 25 normally biases the shaft 23 inwardly with respect to the plate 18.

An angle iron clamping bracket 27 extends parallel to the plate 18 and is welded to the offset portions 24 of the shafts 23 in overlying relation with respect to the plate 18. A pair of shafts 28 identical to the shafts 23 extend through the flange 20 and the bracket 22 for reciprocating movement therein and are each provided with perpendicularly offset outer end portions 29 to which are welded an angle iron bracket 30 extending therebetween in parallel relation to the plate 18.

Coil springs 31 engage over the shafts 28 and have one end thereof in contact with the bracket 22 and the other end thereof in contact with a nut 32 on the shafts 28.

The angle iron brackets 27 and 30 are laterally adjustable with respect to the plate 18 and adapted to engage over the welt of a shoe, shown in broken lines at 33, so that the shoe 33 may be polished while supported thereon.

A plate 34 is arranged in parallel relation with the upper plate 13, and the plate 18 intermediate thereof, and is welded onto the shaft 11. The plate 34 has a covering material 35 secured to the upper and lower surfaces thereof by an adhesive or other desired securing medium, and a pad 36 is secured internally of the clamp 12 to prevent scratching of the support 17.

In the use and operation of the invention, the clamp 12 is engaged over a support 17 with the bootblack sitting on the support 17 in such a position that the plate 34 rests on the upper surface of his legs slightly above the knees. The shoe 33 is then clamped in position by the clamping brackets 27 and 30 and the shoe shining operation is performed.

It can be seen that the bootblack stand 10 can be readily detached from the support 17 and stored between shoe shining operations therewith.

Having thus described the preferred embodiment of the invention, it should be understood that numerous structural modifications and adaptations may be resorted to without departing from the scope of the appended claims.

What is claimed is:

1. A bootblack stand comprising a resilient generally horizontal U-shaped clamp having upper and lower clamping faces arranged in vertically spaced horizontally extending parallel relation, a shaft secured to said clamp and extending upwardly and outwardly therefrom, a horizontal plate secured to the upper outer end of said shaft in spaced parallel relation to the faces of said clamp, means on said plate resiliently engaging and securing a shoe thereon, and laterally extending means on said shaft positioned intermediate said clamp and said plate for engaging the leg of a user for steadying said shaft when in use.

2. A device as claimed in claim 1 wherein the means on said shaft for engaging the leg of a user for steadying said shaft includes a horizontal plate secured to said shaft intermediate the opposite ends thereof, and a pad secured to said plate.

3. A device as claimed in claim 1 wherein the means on said upper plate for securing a shoe thereon includes a pair of oppositely disposed laterally slidable brackets.

4. A device as claimed in claim 3 wherein spring means are provided on said plate for biasing said clamping brackets into clamping engagement with a shoe.

References Cited in the file of this patent

UNITED STATES PATENTS

| 551,997 | Parker | Dec. 24, 1895 |
| 1,178,083 | Lopez | Apr. 4, 1916 |
| 1,795,292 | Frye | Mar. 10, 1931 |
| 1,821,024 | Noble | Sept. 1, 1931 |
| 2,383,678 | Persinger | Aug. 28, 1945 |

FOREIGN PATENTS

| 513,042 | France | Oct. 27, 1920 |